(12) United States Patent
Nakamura et al.

(10) Patent No.: US 7,222,118 B2
(45) Date of Patent: May 22, 2007

(54) COMPUTER PROGRAM PRODUCT FOR ACCESSING DATABASE, RECORDING MEDIUM RECORDING DATABASE ACCESS PROGRAM THEREIN, AND DATABASE ACCESS METHOD

(75) Inventors: Nobuhiro Nakamura, Osaka (JP); Kazuhisa Ikeda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 443 days.

(21) Appl. No.: 10/405,699

(22) Filed: Apr. 3, 2003

(65) Prior Publication Data

US 2003/0208504 A1 Nov. 6, 2003

(30) Foreign Application Priority Data

Apr. 15, 2002 (JP) ............................. 2002-112448

(51) Int. Cl.
*G06F 17/30* (2006.01)
*G06F 9/44* (2006.01)
*G06F 9/45* (2006.01)

(52) U.S. Cl. ........................... 707/4; 717/141; 717/130
(58) Field of Classification Search .............. 707/1–10, 707/100–104.1, 200–205
See application file for complete search history.

(56) References Cited

U.S. PATENT DOCUMENTS

| | | | | |
|---|---|---|---|---|
| 5,566,330 A | * | 10/1996 | Sheffield | 707/4 |
| 5,781,905 A | * | 7/1998 | Awane et al. | 707/102 |
| 5,787,453 A | * | 7/1998 | Kennedy | 715/538 |
| 5,875,334 A | * | 2/1999 | Chow et al. | 717/141 |
| 6,430,556 B1 | * | 8/2002 | Goldberg et al. | 707/4 |
| 6,779,177 B1 | * | 8/2004 | Bahrs et al. | 717/173 |
| 2003/0028539 A1 | * | 2/2003 | Nunome et al. | 707/10 |

FOREIGN PATENT DOCUMENTS

| | | |
|---|---|---|
| JP | 06-324926 | 11/1994 |
| JP | 08-171508 | 7/1996 |
| JP | 11-345235 | 12/1999 |
| JP | P2001-325098 A | 11/2001 |

OTHER PUBLICATIONS

Japanese Office Action for Corresponding Application No. 2002-112448 Mailed Feb. 6, 2007.

* cited by examiner

*Primary Examiner*—Hosain Alam
*Assistant Examiner*—Navneet K Ahluwalia
(74) *Attorney, Agent, or Firm*—McDermott Will & Emery LLP

(57) ABSTRACT

A computer program product for accessing a database is a program product for accessing a database by allowing a computer to execute a plurality of screen components, including a step of designating order of the plurality of screen components to be executed by the computer. Each of the plurality of screen components includes: a step of generating a part except for a "where" clause in an SQL statement in accordance with definition given from the outside for each screen component; a step of generating a screen for inputting and/or outputting data; and a step of generating the "where" clause in the SQL statement in accordance with definition given from the outside for each screen component. Since the screen component as a part of the database access program processes the steps in accordance with definition given from the outside, the screen component can be used by another database access program. Thus, general versatility is obtained and development efficiency is improved.

21 Claims, 15 Drawing Sheets

FIG.5A

FIRST SCREEN 320

| (1) PROCESS OF GENERATING SECOND PART IN SQL STATEMENT | GENERATE NOTHING |
|---|---|
| (2) SCREEN GENERATING PROCESS | GENERATE SEARCH KEY INPUT SCREEN |
| (3) ERROR DETECTING PROCESS | CHECK TYPE SUCH AS NUMERICAL VALUE, CHARACTER AND THE LIKE |
| (4) PROCESS OF GENERATING FIRST PART IN SQL STATEMENT | GENERATE "Where" CLAUSE FROM INPUT DATA |

FIG.5B

SECOND SCREEN 322

| (1) PROCESS OF GENERATING SECOND PART IN SQL STATEMENT | GENERATE SECOND PART IN ACCORDANCE WITH DEFINITION OF PROGRAM DEFINITION FILE |
|---|---|
| (2) SCREEN GENERATING PROCESS | GENERATE SCREEN FOR DISPLAYING SEARCH RESULT |
| (3) ERROR DETECTING PROCESS | DETECT NOTHING |
| (4) PROCESS OF GENERATING FIRST PART IN SQL STATEMENT | GENERATE NOTHING |

FIG.7A

SCREEN 1 (OUTPUT OF FIRST SCREEN)

| SEARCH | RESET |

■ SECTION ID  [    ]  ⊙ EQUAL TO OR LARGER  ⊙ OVER
               ⊙ EQUAL TO OR SMALLER  ⊙ LESS THAN

| SEARCH | RESET |

FIG.7B

SCREEN 2 (OUTPUT OF SECOND SCREEN)

4 HITS Page No.1:1

| No. | SECTION ID | SECTION NAME |
|-----|------------|--------------|
| 1 | 1 | 0.SECTION NAME xxxxxxxxxxxxxxxxxxxxxxxxxxxxx |
| 2 | 2 | 1.SECTION NAME xxxxxxxxxxxxxxxxxxxxxxxxxxxxx |
| 3 | 3 | 2.SECTION NAME xxxxxxxxxxxxxxxxxxxxxxxxxxxxx |
| 4 | 4 | 3.SECTION NAME xxxxxxxxxxxxxxxxxxxxxxxxxxxxx |

FIG.8

```
public PtnRef( PtnParam x_pp ) {
        super( x_pp );
        addScreen( 10, 11, "PtnScrSearch" ); // SEARCH SCREEN
        addScreen( 11, 12, "PtnScrList" );   // DISPLAY LIST
        addScreen( 12, 0,  "PtnScrDetail" ); // DISPLAY DETAILS
}
```

FIG.9A

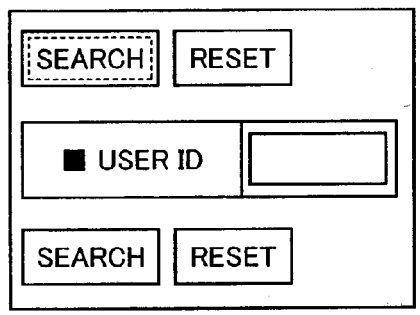

FIG.9B

22 HITS Page No.1: NEXT PAGE 1 2 3 4 5

| No. | USER ID | NAME | INITIAL PASSWORD CHANGE F | PASSWORD VALIDITY |
|---|---|---|---|---|
| 1 | sumitomo1 | TARO SUMITOMO | CHANGED | 2000-12-31 |
| 2 | sumitomo2 | HANAKO SUMITOMO | CHANGED | 1999-10-01 |
| 3 | sumitomo3 | SABURO SUMITOMO | CHANGED | 2000-12-31 |

FIG.9C

| USER ID | sumitomo1 |
|---|---|
| NAME | TARO SUMITOMO |
| PRONUNCIATION | taro sumitomo |
| ROMAN LETTERS | sumitomo taro |
| INITIAL PASSWORD CHANGE F | CHANGED |
| PASSWORD VALIDITY | 2000-12-31 |

FIG.12

```
FD
/FILE=ZYUTYU, ORDER RECEPTION,...
/RECORD
ORDER NUMBER, ZYUTYUNO, N9, ...
COMMODITY CODE, SYOHINCODE, N10, ...
COMMODITY NAME, SYOHINMEI, X20, ...
  ⋮
/END
```
160

FIG.13

```
DD
/DD=ZYUTYUNO, ORDER RECEPTION NUMBER
/LANG=1,Order Number
/INPUTTYPE=TEXT
/TYPE=N
/MAXLENGTH=9
/ALIGN=RIGHT
  ⋮
/END
```
168

MAIN (USING ITEM OBJECT)

String[ ] p_fields={"userid","username",...} — 420

CALL FORM COMPONENT NAME (p_fields); — 421

COMPUTER PROGRAM PRODUCT FOR ACCESSING DATABASE, RECORDING MEDIUM RECORDING DATABASE ACCESS PROGRAM THEREIN, AND DATABASE ACCESS METHOD

BACKGROUND OF THE INVENTION

1. Field of the Invention

The present invention relates to a computer program product for accessing a database, a computer-readable recording medium in which the program is recorded, and a database operating method. More particularly, the present invention relates to a database access program product which can be easily applied to a process adapted to business operations, a computer-readable recording medium in which the program is recorded, and a database operating method.

2. Description of the Background Art

Conventionally, in system development using a computer, reduction in development cost, shortening of delivery, and improvement in quality are important subjects. In order to achieve the subjects, attempts such as shift from a design method centering on procedures to a design method centering on data, introduction of an RAD (Rapid Application Development) method, and component programming have been made and certain effects are obtained.

For example, productivity is largely improved by introduction of a design development method centering on data. According to the RAD method, a development cycle can be shortened by building a prototype in accordance with a request of the user, recognizing the request of the user more specifically on the basis of a result of the prototyping, and correcting the prototype. As a result, in a system in which the RAD method is introduced, mainly, shortening of the periods of external designing and detailed designing and reduction in cost can be achieved. As a result, the proportion of the phase of program generation is becoming relatively large in the whole system development.

Recently, the number of cases of employing an intranet for a development platform of a backbone system of a company is increasing. In a networked company, it is efficient to construct a backbone system by using an application server. Typically, in system development of an application server, a tag language which is an extension of the HTML (HyperText Markup Language) is used. The tag language is easy to learn and is evaluated as an intranet development tool with high productivity.

However, as the environments of companies are becoming tougher, requirements for system development are becoming higher. Concretely, as the business cycle of a company is being shortened, further shortening of delivery is requested. A company capable of providing a product at lower cost is advantageous.

Since the proportion of the phase of program generation in system development is becoming relatively large, it is important to improve the productivity in the phase. It seems to be most efficient to promote component programming.

The component programming decreases the number of processes necessary for system development and contributes to enhancement of competitiveness of system development from the viewpoints of reduction in a period necessary for the system development and reduction in the cost of the system development. By using only a sufficiently reliable program as a component, the component programming can contribute to improvement in quality of a system. Therefore, it is important to perform component programming efficiently and built an application program by efficiently combining components prepared by the component programming.

However, the function of component programming of the tag language conventionally used for development of an intranet system is weak. Consequently, as long as the conventional tag language is used as it is, it is obvious that improvement of productivity cannot be expected so much.

FIG. 18 is a block diagram showing the configuration of a general system of an intranet using a database (DB). Referring to FIG. 18, a general intranet 600 includes an application server 612, a DB server 614 and a plurality of client PCs 616 which can perform communication with each other via a network 610 by using a protocol called HTTP (Hyper Text Transfer Protocol).

On client PC 616, a general browser 630 operates.

On DB server 614, an RDBMS (Relational DataBase Management System) 622 operates.

On application server 612, a WWW server 618 operates. The "WWW" is an abbreviation of "World Wide Web". The substance of WWW server 618 is a Java (R) servlet engine 620. Java (R) servlet engine 620 supplies information (HTML source) for forming a screen used to access RDBMS 622 to browser 630 in accordance with a request given from browser 630 of client PC 616 via network 610. Browser 630 displays the screen and returns information entered by the user to Java (R) servlet engine 620. Java (R) servlet engine 620 accesses RDBMS 622 in accordance with information given and returns the HTML source for displaying a result to browser 630. Browser 630 displays the result, thereby responding to the request of the user.

In such a manner, intranet 600 processes requests from the plurality of client PCs 616 by WWW server 618 which operates on application server 612 and returns the result to the browser on each client, thereby performing a business process using RDBMS 622.

In the case of developing a program adapted to a number of business operations, screens to be displayed on the browser have to be generated one by one. In this case, by copying a necessary part in a business program generated and modifying only different parts, another business program can be generated. However, in the case where a bug is found in the original business program, all of the generated business programs have to be checked in order to remove the bug.

In order to avoid the problem, a component common to business programs is used as a module and called as a so-called subroutine. In the case of using the common component as a module, it is sufficient to correct only the module including the bug and it is unnecessary to correct a higher-order business program using the module.

However, a program is conventionally designed in modules on the unit basis of a series of processes for accessing RDBM 622, such as a process for displaying a screen used to input conditions for access, a process of accessing RDBMS 622 on the basis of the inputted conditions, and a process of displaying data obtained as a result of the access. When a series of processes is designed as a module, the use of the module is limited to the series of the processes and a problem such that general versatility cannot be obtained occurs.

Although it is also possible that a series of processes is divided into a plurality of parts and the parts are respectively modularized in order to give general versatility, the number of the modules generated increases and it causes a problem such that efficiency of generating a business program deteriorates.

SUMMARY OF THE INVENTION

The present invention has been achieved to solve the problems and an object of the present invention is to provide a database access program product generated by combining general modules.

Another object of the present invention is to provide a database access program product with improved development efficiency.

Still another object of the present invention is to provide a database access program product which can easily address a change.

Yet another object of the present invention is to provide a database operating method capable of easily operating a database.

In order to achieve the objects, according to an aspect of the present invention, a database access program product for accessing a database by allowing a computer to execute a plurality of screen components, includes a step of designating order of the plurality of screen components to be executed by the computer. Each of the plurality of screen components includes the steps of: generating a second part except for a first part for specifying data to be processed in a command for accessing the database in accordance with definition given from the outside for each screen component; generating a screen for inputting and/or outputting data; and generating the first part for specifying data to be processed in the command for accessing the database in accordance with definition supplied from the outside for each screen component.

According to the present invention, the order of the plurality of screen components to be executed by the computer is designated. Each of the plurality of screen components executed in accordance with the designated order includes the steps of: generating a second part except for a first part for specifying data to be processed in a command for accessing the database in accordance with definition given from the outside for each screen component; generating a screen for inputting and/or outputting data; and generating the first part for specifying data to be processed in the command for accessing the database in accordance with definition given from the outside for each screen component. Since steps are processed in accordance with definition given from the outside, the screen component as a part of the database access program can be used by another database access program. As a result, the database access program product obtained by general screen components and a computer-readable recording medium in which the program is recorded can be provided. Since a database access program can be generated by combining general screen components, efficiency of developing the database access program can be improved.

Preferably, the screen generating step generates a screen in accordance with an item in the database given from the outside for each screen component. Consequently, it is unnecessary to provide items of a database in a screen component, so that general versatility of the screen component is further increased.

Preferably, the program product further includes a step of designating an order to execute the steps included in each of the plurality of screen components so as to be executed in the same order in all of the plurality of screen components.

According to the present invention, since steps included in each of the plurality of screen components are designated so as to be executed in the same order in any of the plurality of screen components, it is unnecessary to consider the order of executing steps included in a screen component. Consequently, the number of processes of developing the database access program can be reduced.

Preferably, each of the plurality of screen components further includes a step of checking obtained data in accordance with items of the database, given from the outside for each screen component.

According to the present invention, each of the plurality of screen components checks obtained data in accordance with items of the database, given from the outside for each screen component. Since the items of the database necessary for check are given from the outside, it is unnecessary to provide the items of the database in the screen component. Thus, the screen component can be easily applied to another database access program.

Preferably, in the step of generating the first part, the first part in a command which is executed when the next screen component is implemented by a computer is generated.

According to the present invention, in the step of generating the first part, the first part in the command executed when the next screen component is implemented by the computer is generated. In the case where data for generating the first part in the command executed next by the computer is inputted via the generated screen, when the screen is changed, the step of generating the first part has to be changed. Since the other part changed in relation to the change in the screen is included in a single screen component, it is sufficient to change only one screen component for one change. As a result, the database access program product capable of easily dealing with a change can be provided.

Preferably, in the step of generating the first part, the first part in the command is generated on the basis of data checked in the check step.

According to the present invention, in the step of generating the first part, the first part in a command is generated on the basis of data checked in the check step. When the data to be checked is changed, the step of generating the first part has to be changed. Since the other part which is changed in relation to the change in the data to be checked is included in a single screen component, it is sufficient to change only one screen component with respect to one change. As a result, the database access program product capable of easily dealing with the change can be provided.

Preferably, the step of generating the second part includes a process which does not generate the second part.

According to the present invention, even in the case where it is unnecessary to access the database, the process of generating the second part in the command for accessing the database is included in the screen component. Therefore, the same process can be defined by all of screen components.

Preferably, the check step includes a process of checking nothing.

According to the present invention, even in the case where it is unnecessary to check data, the check step is included in a screen component. Therefore, the same process can be defined by all of the screen components.

Preferably, the step of generating the first part includes a process which does not generate the first part.

According to the present invention, even in the case where a screen component to be executed next does not exist, the process of generating the first part in a command is included in the screen component. Thus, the same process can be defined by all of the screen components.

According to another aspect of the present invention, a method of operating a database by allowing a computer to execute a plurality of screen components, includes a step of designating order of the plurality of screen components to be executed by the computer. Each of the plurality of screen components includes the steps of: generating a second part except for a first part for specifying data to be processed in a command for accessing the database in accordance with definition given from the outside for each screen component; generating a screen for inputting and/or outputting data; and generating the first part for specifying data to be processed in the command for accessing the database in accordance with definition given from the outside for each screen component.

According to the present invention, since steps are processed in accordance with definition given from the outside, the screen component as a part of the database access program can be used by another database access program. Consequently, only by designating order of executing the plurality of screen components, the database can be operated. As a result, the database operating method capable of easily operating a database can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are diagrams showing an example of processes defined by a program pattern of a referring process;

FIGS. 7A and 7B are diagrams showing an example of screens which are outputted when the program pattern is executed;

FIG. 8 is a diagram showing a concrete example of a program pattern using three screen components;

FIGS. 9A, 9B and 9C are diagrams showing an example of screens displayed by calling a screen component;

FIG. 12 is a diagram showing an example of a DB definition file;

FIG. 13 is a diagram showing an example of a data definition file of item objects;

DESCRIPTION OF THE PREFERRED EMBODIMENTS

Figure 1:
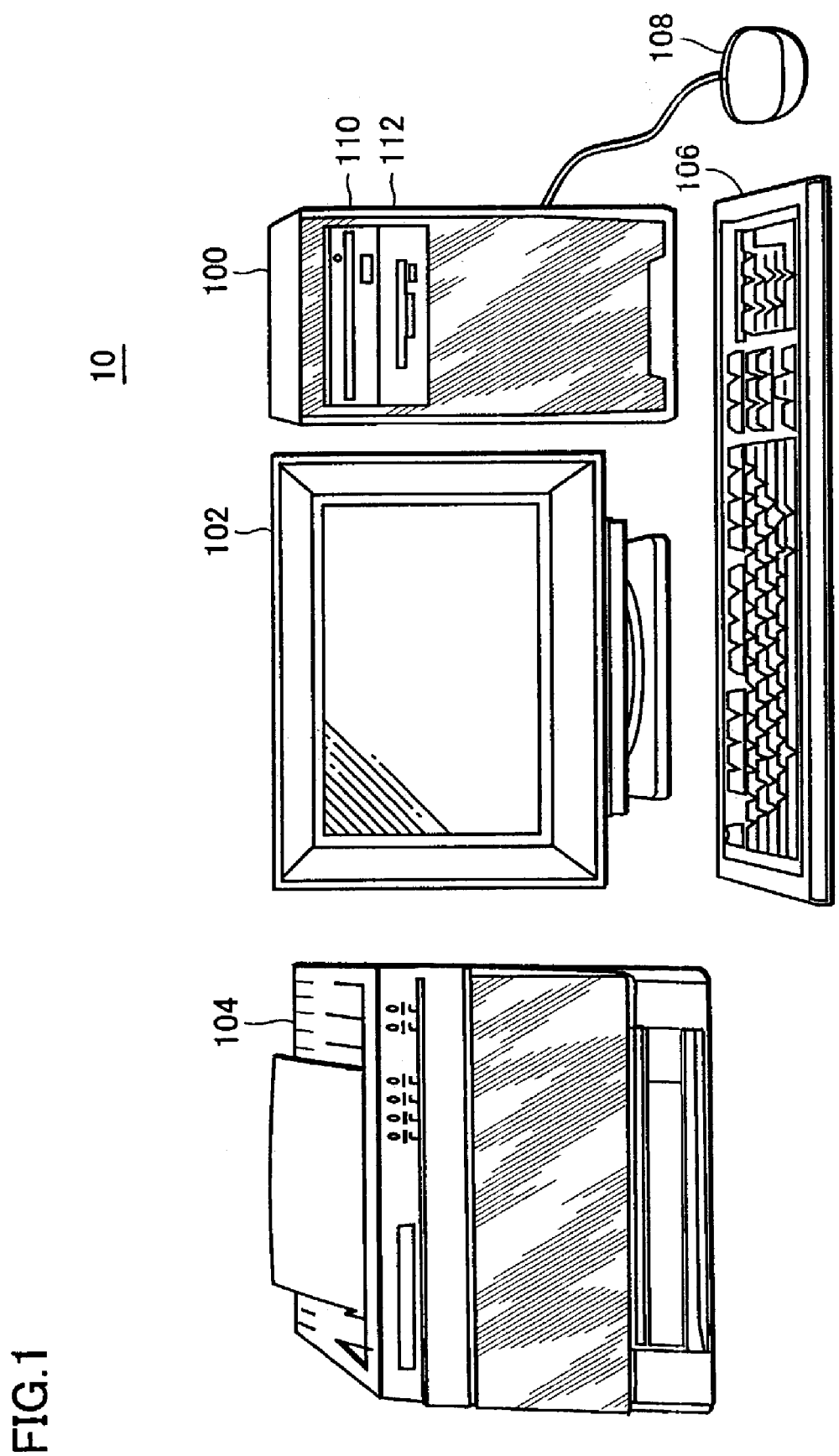
FIG. 1 is an external view of a server in an embodiment of the present invention.

Hereinafter, embodiments of the present invention will be described with reference to the drawings. In the following description, the same components are designated by the same reference numerals and their names and functions are the same. Consequently, their detailed description will not be repeatedly given.

FIG. 1 is an external view of a server in an embodiment of the present invention. As described below, a server 10 is constructed by a general personal computer.

Referring to FIG. 1, server 10 includes a computer 100 having a CD-ROM (Compact Disc Read-Only Memory) drive 110 and an FD (Flexible Disk) drive 112, a display 102, a printer 104, a keyboard 106, and a mouse 108.

Figure 2:
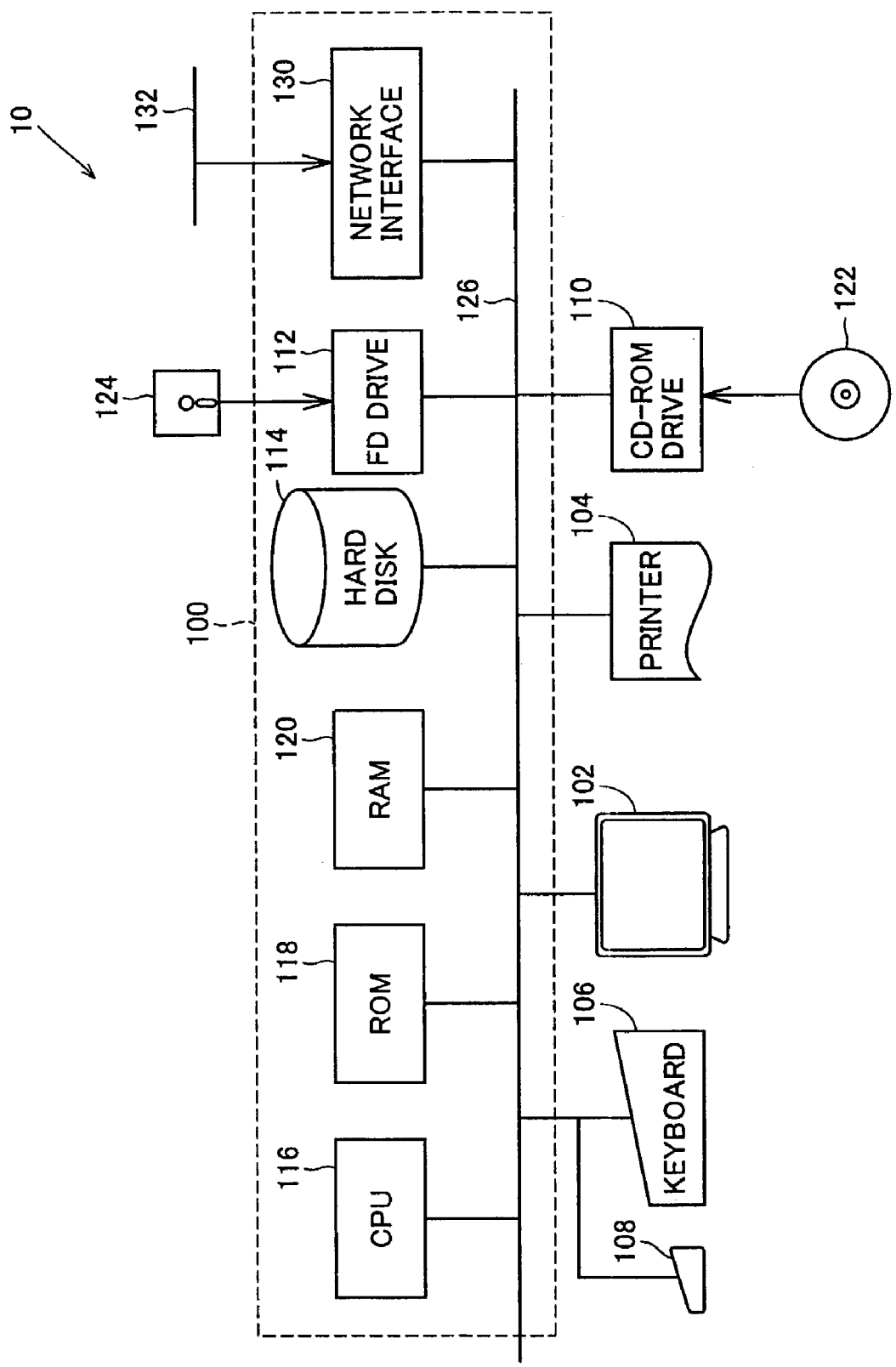
FIG. 2 is a block diagram showing the configuration of the server according to the present invention.

FIG. 2 is a block diagram showing the configuration of server 10. As shown in FIG. 2, server 10 includes, in addition to CD-ROM drive 110 and FD drive 112, a CPU (Central Processing Unit) 116, a ROM (Read Only Memory) 118 storing a boot-up program of an operating system or the like, a RAM (Random Access Memory) 120 to which a program to be executed is loaded and data of a program being executed is stored, a hard disk 114 for storing a generated program or the like in a nonvolatile manner, and a network interface 130 for connecting computer 100 to a network 132. The components are connected to a bus 126. A CD-ROM 122 is inserted into CD-ROM drive 110. An FD 124 is inserted into FD drive 112.

As described above, in the server, a database is recorded in hard disk 114, and a database access program is executed by CPU 116, thereby operating the database. Generally, such a database access program is stored in a recording medium such as CD-ROM 122 or FD 124, distributed in a stored form, read from the recording medium by CD-ROM drive 110, FD drive 112 or the like, and temporarily stored in hard disk 114. Further, the database access program is read from hard disk 114 to RAM 120 and executed by CPU 116. The hardware itself of server 10 shown in FIGS. 1 and 2 is a general one. Therefore, the most essential part of the present invention is the database access program stored in a recording medium such as CD-ROM 112, FD 124 or hard disk 114.

The recording media are not limited to CD-ROM 122, FD 124, and hard disk 114. A medium fixedly carrying a program, such as a magnetic tape, a cassette tape, an optical disk (MO (Magnetic Optical Disc), an MD (Mini Disc) or a DVD (Digital Versatile Disc)), an IC card (including a memory card), an optical card, a semiconductor memory such as a mask ROM, an EPROM, an EEPROM, or the like may be used.

The program is a concept including not only a program which can be executed directly by CPU 116 but also a program of a source program format, a compressed program, an encrypted program and the like.

As the operation itself of the computer shown in FIGS. 1 and 2 is known, its detailed description will not be repeatedly given herein.

Figure 3:
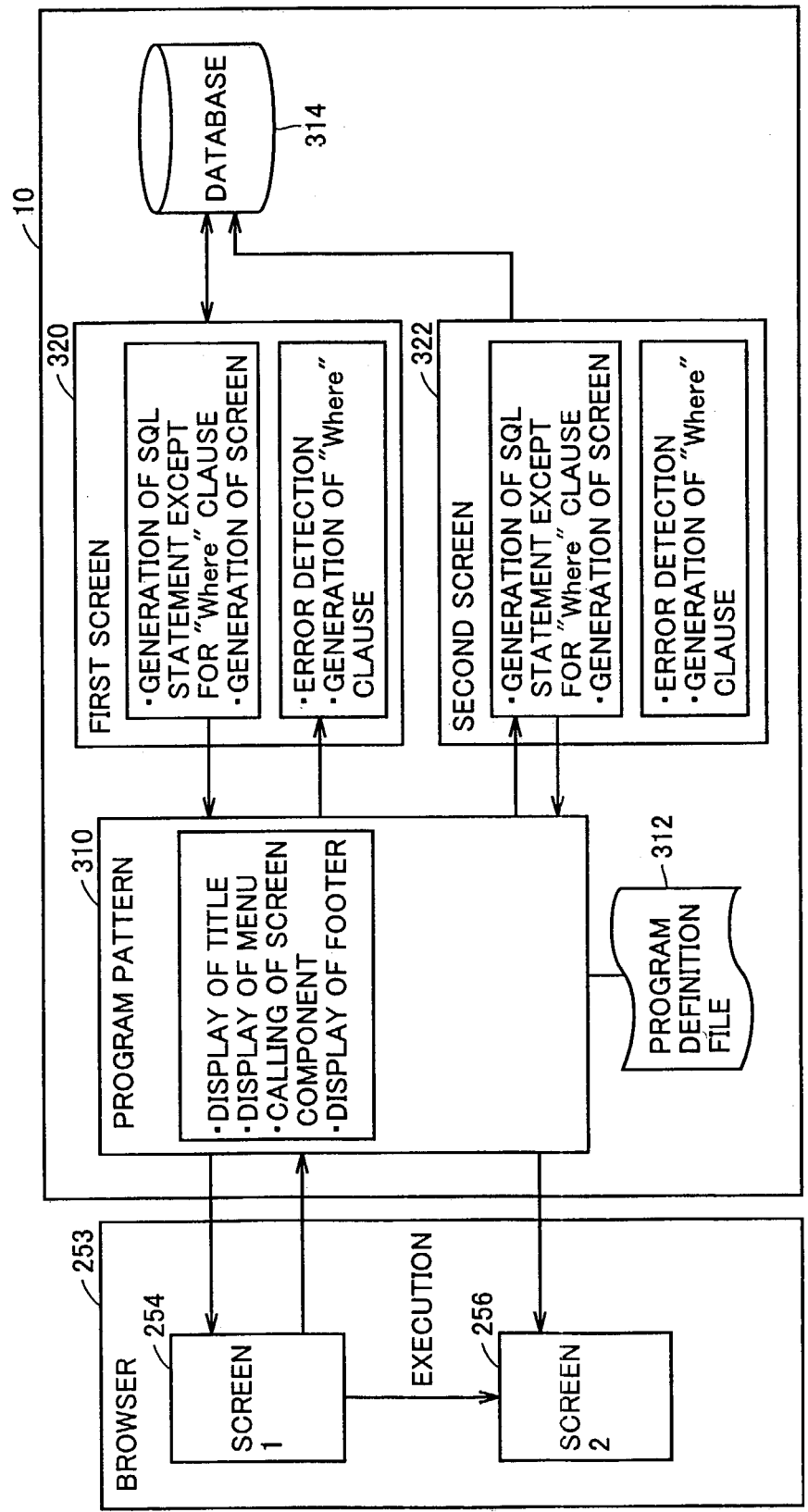
FIG. 3 is a diagram for describing a concept of executing a database access program in the server in the embodiment.

FIG. 3 is a diagram for describing a concept that the database access program is executed by server 10 in the embodiment. Referring to FIG. 3, server 10 includes: a program pattern 310 for processing a request from a browser 253 or the like which operates on the client PC; a first screen 320 and a second screen 322 as screen components called when program pattern 310 is executed; a program definition file 312 which is referred to by called screen components 320 and 322; and a database 314.

Program definition file 312 is a file recording information necessary to define a program and is described in, for example, the XML (eXtensible Markup Language) or CSV (Comma Separated Values). The details of program definition file 312 will be described later.

Database 314 is a relational database, includes a definition file for defining the structure of the database, and is recorded in a storage unit such as hard disk 114 or the like. Although the relational database will be described as an example in the embodiment, the database is not limited thereto but can be a database of another format.

Program pattern 310, program definition file 312 and screen components 320 and 322 are preliminarily generated and recorded in a storage unit such as hard disk 114 of server 10. The database access program is constructed by program pattern 310, program definition file 312, and screen components 320 and 322. A plurality of program patterns 310 and a plurality of screen components 320 and 322 are prepared in general forms. Only by forming program definition file 312 in accordance with a business process to be processed, a database access program according to the business can be generated. This will be described more specifically.

Program pattern 310 is a program describing a process of accessing database 314. The process of accessing database 314 is a process performed on data registered in database 314 and is classified into, for example, four processes of a referring process of referring to data registered, a registering process of newly registering data to database 314, an updating process of updating the data registered, and a deleting process of deleting data registered.

The referring process, registering process, updating process or deleting process can be described with respect to data related to a plurality of tables defined in database 314. As described above, the program pattern is a program described by standardizing the process of accessing database 314.

The program pattern for executing the referring process will be described as an example. In the referring process, (1) a process of inputting data serving as a key for referring to data, (2) a process of extracting data corresponding to the key data from the database and displaying a list of the extracted data, and (3) a process of displaying detailed data of specific data in the data of the list are defined. The program pattern for executing the referring process is defined so that the processes are executed in this order.

Each process needs one screen for inputting data or outputting data. A screen component defines the process for displaying the screen and the above described processes more specifically in relation to the screen.

In the program pattern, only by defining designation of a screen component used and the order of calling the designated screen component, a series of the referring process, registering process, updating process and deleting process of database 314 can be defined.

Screen components 320 and 322 define a plurality of processes read by the program pattern. The plurality of processes defined are (1) a process of generating a part (second part) except for a part for specifying data to be processed in a command for accessing a database, (2) a process for generating a screen, (3) a process for checking data, and (4) a process of generating the part (first part) for specifying the data to be processed in the command for accessing the database.

In the following, a part for specifying data to be processed in a command for accessing a database is referred to as a first part, and the part except for the first part is referred to as a second part.

More concretely, (1) the process of generating the second part in the command for accessing the database is a process of generating the part except for a "where" clause in an SQL (Structured Query Language) statement. The second part in the command for accessing the database is defined by program definition file 312 which will be described later.

In the process of generating the second part, a process of generating nothing can be defined. In this case, even if the process of generating the second part is called from program pattern 310, the part except for the "where" clause in the SQL statement is not generated. For example, in the referring process, in the screen component for displaying a screen for inputting key data, as the process of generating the second part, a process of generating nothing is defined.

In (2) the process of generating a screen, for example, when the SQL statement is executed, a screen including data obtained as a result is generated. When the SQL statement is not executed, a screen for inputting data is generated. In the generation of a screen, items of a database for specifying data to be included in the screen and items of a database for specifying data to be inputted are defined by program definition file 312.

In (3) the process of checking data, data obtained via the generated screen is checked. Items of a database for specifying data to be checked are defined by program definition file 312. In the process of checking the data, if a check is unnecessary, a process of checking nothing can be defined. In this case, even if the process of checking data is called from program pattern 310, data is not checked.

In (4) the process of generating the first part in the command for accessing database 314, a "where" clause in an SQL statement is generated. When checked data exists, a "where" clause is generated according to definition of program definition file 312 on the basis of the checked data. As the process of generating the first part, the process of generating nothing can be defined. The process of generating nothing is defined in the case where an SQL statement to be executed next does not exist, for example, in the case where a screen component to be executed next does not exist. In this case, even if the process of generating the first part is called from program pattern 310, a "where" clause in an SQL statement is not generated.

As described above, each of screen components 320 and 322 defines, as a set, generation of the second part in the command for accessing a database, generation of a screen to be outputted, check of data obtained related to the outputted screen, and generation of the first part in the command for accessing the database. That is, each of screen components 320 and 322 defines the four processes as a set related to the screen to be outputted.

Consequently, when a change occurs in the output screen, the process of checking data which is inputted via the screen and the process of generating the first part in the command generated on the basis of the checked data have to be corrected. However, since the processes are defined in a single screen component, maintenance is easy.

The part (first part) for specifying data to be processed in an SQL statement and the other part (second part) will be described more concretely.

<Reference>

An example of an SQL statement used for referring to data will be shown.

SELECT userid, username, pronunciation
FROM emp
WHERE userid='sumitomo1'

In the SQL statement, the third line corresponds to the first part, and the first and second lines correspond to the second part. The first and second lines are defined by program definition file 312. Consequently, the process of generating the second part is a process of reading definition of program definition file 312. The third line corresponds to the first part and is generated on the basis of a field "userid" of the database defined by program definition file 312 and inputted data "sumitomo1".

<Registration>

An example of an SQL statement used for registering data will be described.

INSERT INTO emp (userid, username, pronunciation)
    VALUES ('sumitomo1', 'TARO SUMITOMO', 'taro sumitomo')

The SQL statement does not include the first part. In this case, therefore, the first part is not generated. The first and second lines correspond to the second part and are generated on the basis of the table "emp" and the fields of "userid", "username", and "pronunciation" of the database defined by program definition file 312, and the inputted data of "sumitomo1", "TARO SUMITOMO", and "taro sumitomo".

<Update>

An example of an SQL statement used for updating data will be shown.

UPDATE emp SET username='TARO SUMITOMO', pronunciation='taro sumitomo'
    WHERE userid='sumitomo1'

In the SQL statement, the second line corresponds to the first part, and the first line corresponds to the second part. The second part of the first line is generated on the basis of the table "emp" and the fields of "username" and "pronunciation" of the database defined by program definition file 312, and inputted data of "TARO SUMITOMO" and "taro sumitomo". The first part of the second line is generated on the basis of the field "userid" of the database defined by program definition file 312 and the inputted data "sumitomo1".

<Deletion>

An example of an SQL statement used at the time of deleting data will be shown.

DELETE FROM emp
    WHERE userid='sumitomo1'

In the SQL statement, the second line corresponds to the first part, and the first line corresponds to the second part. The second part of the first line is defined by program definition file 312. Consequently, the process of generating the second part is generated on the basis of the table "emp" of database defined in program definition file 312. The first part of the second line is generated on the basis of the field "userid" of the database defined by program definition file 312 and the inputted data "sumitomo1".

Program definition file 312 is a file which is referred to when processes defined by screen component 320 or 322 are executed. In program definition file 312, for example, items of a database used in a command (SQL statement) for accessing database 314, items of a database displayed on a screen generated, items of a database for checking data, and items of a database used for generating a "where" clause are defined.

As described above, the logic part of functions (reference, registration, updating, deletion and the like) for operating database 314 is defined by program pattern 310. Consequently, a screen component can be also used by a program pattern achieving the other function so that screen components can be efficiently reused.

Since the four processes are defined in the screen component, at the time of generating a program pattern, it is sufficient to call all of the four processes of the screen component in predetermined order. Consequently, it is unnecessary to consider whether a process to be called or not according to a screen component and consider the order of calling the processes. As a result, at the time of generating program pattern 310, the method of calling the screen components can be-standardized, and efficiency of generating a program pattern can be improved.

Further, in the case of generating a business program for operating database 314 by using program pattern 310, it is sufficient to define items defined in database 314, into program definition file 312 in accordance with program pattern 310. Consequently, efficiency of developing a business program is improved.

Further, since information regarding database 314 required by a process defined in screen components 320 and 322 is defined in program definition file 312, screen components 320 and 322 do not depend on the structure of database 314. Consequently, processes can be defined in screen components 320 and 322 irrespective of the structure of database 314.

Although four processes are defined in each of screen components 320 and 322 in the embodiment, for example, the three processes except for the data checking process (3) may be defined in a screen component. In this case, three processes are defined in each of all of the other screen components.

Figure 4:
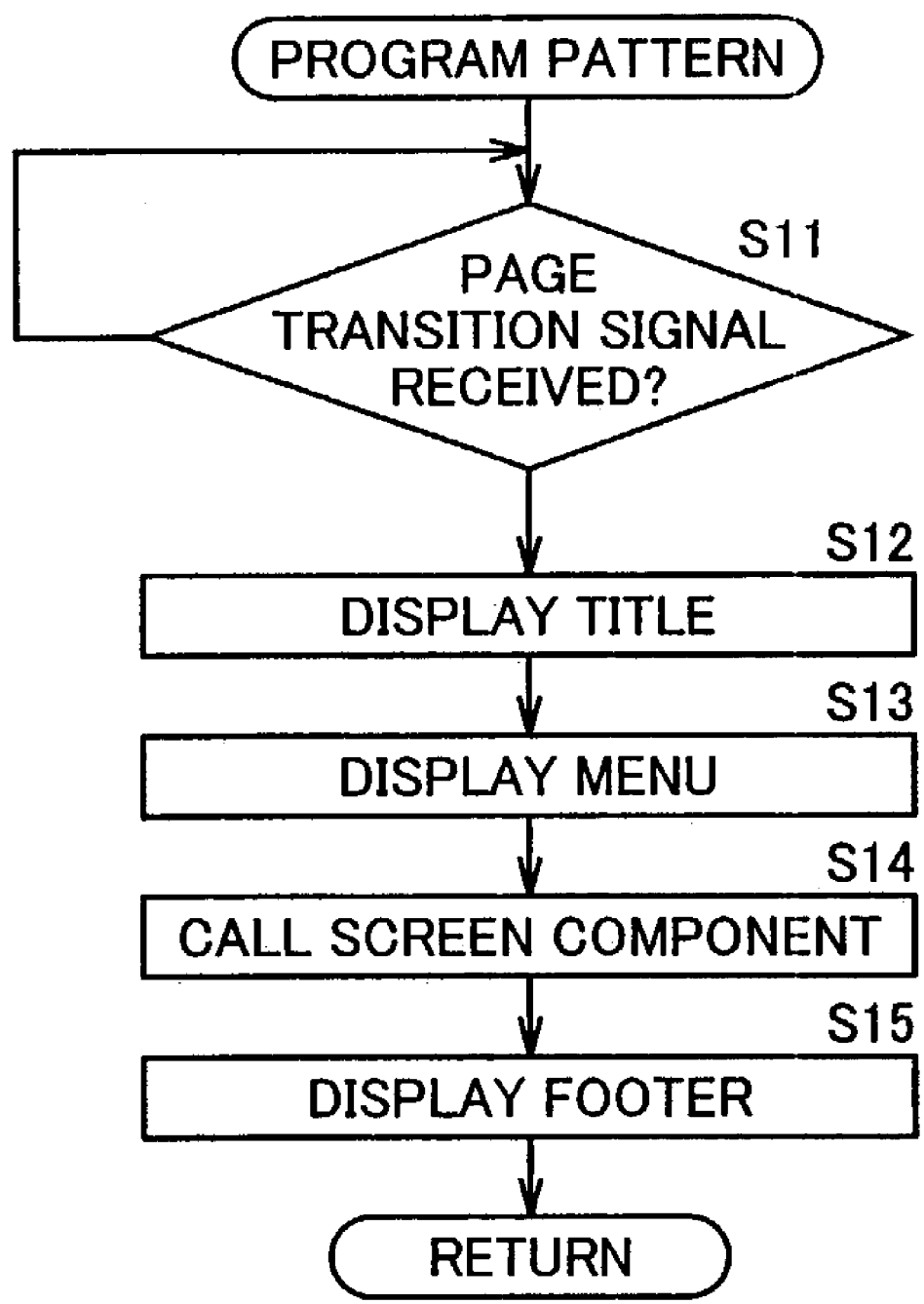
FIG. 4 is a flowchart showing the flow of processes performed when a program pattern is executed by the server in the embodiment.

FIG. 4 is a flowchart showing the flow of processes performed when a program pattern is executed by the server in the embodiment. Referring to FIG. 4, program pattern 310 receives a page transition signal which requests display from browser 253 (step S11). The page transition signal denotes page number of a web page requested to be displayed. Program pattern 310 receives the page transition signal, displays a title corresponding to the page transition signal (step S12), displays a menu (step S13), calls a screen component (step S14), and displays a footer (step S15). In such a manner, a web page is generated in the HTML and transmitted to browser 253.

Each time a page transition signal is received from the browser, program pattern 310 executes the processes shown in FIG. 4. The processes shown in FIG. 4 are processes determined in correspondence with each page transition signal and vary according to a page transition signal. Therefore, according to the page transition signal, the title to be displayed, menu to be displayed, screen component to be called, and footer to be displayed can vary.

In order to describe the screen component calling process executed in step S14 more concretely, an example of the program pattern of the referring process will be described. FIGS. 5A and 5B show first and second screens 320 and 322, respectively, as screen components used in this case. FIG. 5A shows processes defined in first screen 320 and FIG. 5B shows processes defined in second screen 322.

Referring to FIG. 5A, in first screen 320, (1) as a process of generating the second part in a command (SQL statement) for accessing a database, a process for generating nothing is defined. (2) As a process of generating a screen, a process of generating a screen for inputting a search key is defined. The search key is defined in program definition file 312. (3) As a data checking process, a process of detecting whether or not the form of a numerical value or a character of data which is inputted as a search key matches definition of database 314. (4) As a process of generating the first part in the command (SQL statement) for accessing the database, a process of generating a "where" clause for operating the database with an inputted search key is defined.

Referring to FIG. 5B, in second screen 322, (1) as a process of generating the second part in the command (SQL statement) for accessing the database, a process of generating the second part on the basis of a program definition file is defined. (2) As a process of generating a screen, a process of generating a screen for displaying data obtained by executing the SQL statement is defined. Items to be displayed are defined in program definition file 312. (3) As the data checking data, a process of detecting nothing is defined. (4) As a process of generating the first part in the command (SQL statement) for accessing the database, a process of generating nothing is defined.

Figure 6:
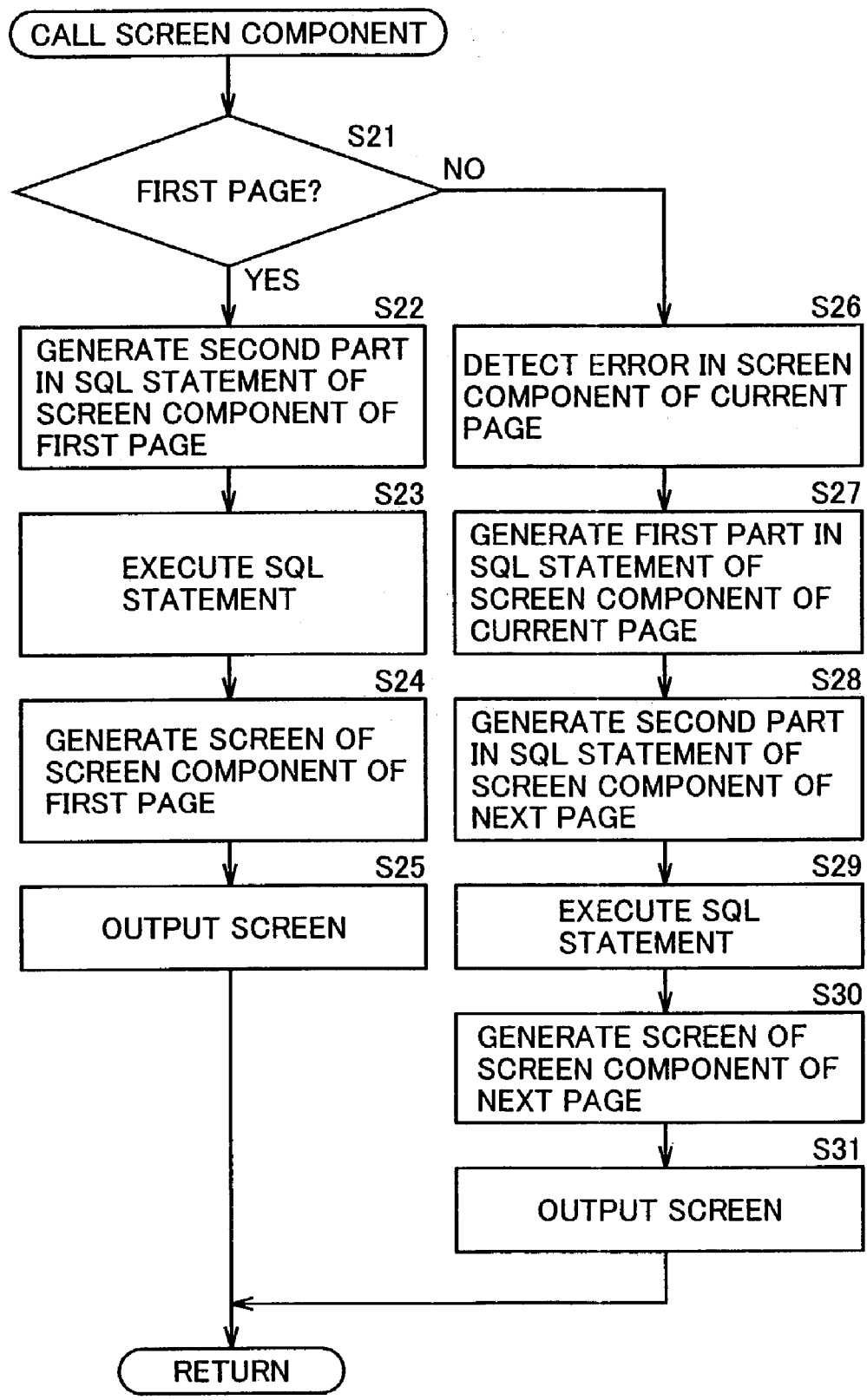
FIG. 6 is a flowchart showing the flow of a screen component calling process executed in step S14 in FIG. 4.

FIG. 6 is a flowchart showing the flow of the screen component calling process executed in step S14 in FIG. 4. The case where first and second screens 320 and 322 shown in FIGS. 5A and 5B are called will be described. In this case, first screen 320 is a screen component corresponding to the first page, and second screen 322 is a screen component corresponding to the second page.

Referring to FIG. 6, in the screen component calling process, whether or not the page transition signal is a signal requesting that the first page is displayed is determined (step S21). If YES, the program advances to step S22. If NO, the program advances to step S26. In this case, the first page corresponds to "first page".

In step S22, an instruction of executing the process of generating the second part in the SQL statement defined by the screen component corresponding to the first page is given. A process of generating the second part in the SQL statement defined in first screen 320 corresponding to the first page is executed here. Since the process of generating nothing is defined as the process of generating the second part in the SQL statement defined in first screen 320, nothing is generated.

In step S23, the SQL statement stored in a common area of a memory shared by screen components 320 and 322 is executed. Since the second part in the SQL statement is not generated in step S22, the SQL statement is not written in the common area of the memory and is not executed. Therefore, database 314 is not accessed.

After that, an instruction of executing the process of generating the screen defined in the screen component corresponding to the first page is given (step S24). In this case, a search key input screen defined in first screen 320 is generated. Generated search key input screen 254 is outputted to browser 253 (step S25). In the program pattern, a screen (web page) described in the HTML corresponding to the first page is generated and transmitted to browser 253. After that, the process is finished and the program returns to step S15 of the program pattern.

As described above, the process of generating the second part in the SQL statement defined in first screen 320 and the process of generating a screen are sequentially designated. Since the SQL statement which executes nothing is defined in first screen 320, in the screen component calling process, it is sufficient to call the process of generating the second part in the SQL statement irrespective of whether the second part in the SQL statement has to be generated or not. Consequently, the screen component calling process can be standardized and generated efficiently.

FIGS. 7A and 7B are diagrams each showing an example of a screen which is outputted when the program pattern is executed. FIG. 7A is a diagram showing a search key input screen defined in first screen 320. A screen including an item of inputting a section ID as a search key is displayed.

Referring again to FIG. 6, when it is determined in step S21 that the page transition signal does not indicate the first page, an instruction of executing an error detecting process defined by a screen component corresponding to the current page is given (step S26). The current page denotes a page currently displayed on browser 253.

For example, when the second page is received as a page transition signal, the current page is the first page, and the next page is the second page. A case where the second page is received as the page transition signal will be described as an example. An instruction of executing the error detecting process defined in first screen 320 corresponding to the current page, that is, the first page is given. At the time point when the process is executed, a screen (FIG. 7A) defined in first screen 320 corresponding to the first page is displayed on browser 253.

Therefore, as key data, a section ID is entered via the screen shown in FIG. 7A. Together with the section ID inputted from browser 253, the page transition signal (second page) is received. Whether the form of a numerical value, a character or the like is correct or not is checked with respect to the section ID as the received key data. When the form of the numerical value or character of the section ID is erroneous, a screen including a message of entering the section ID again may be generated and transmitted to browser 253.

On the basis of the checked key data, an instruction is given for executing the process of generating the first part ("where" clause) in the SQL statement defined in first screen 320 corresponding to the current page (the first page) (step S27). In such a manner, on the basis of the checked key data, the "where" clause in the SQL statement is generated. The generated "where" clause is stored in the area shared by screen components 320 and 322 in RAM 120.

In the following step S28, an instruction of executing the process of generating the second part in the SQL statement defined by the screen component corresponding to the next page is given. In this case, the process of generating the second part in the SQL statement defined in second screen 322 corresponding to the second page is executed. The process of generating the second part in the SQL statement defined by second screen 322 is generated in accordance with the definition of program definition file 312. The second part ("select" statement) in the SQL statement for extracting data matching the inputted section ID is generated. The generated second part is stored in the area shared by screen components 320 and 322 in RAM 120. By the first part ("where" clause) in the SQL statement generated in step S27 and the second part ("select" statement) in the SQL statement generated in step S28, the SQL statement is completed and stored in the area shared by screen components 320 and 322 in RAM 120.

After that, the SQL statement stored in the area shared by screen components 320 and 322 in RAM 120 is executed (step S29).

In order to output data obtained as a result of the execution, an instruction of executing the process of generating a screen defined by the screen component (second screen component 322) corresponding to the next page (the second page) is given (step S30). Screen 256 generated is outputted to browser 253 (step S31). After that, the process is finished, and the program returns to step S15 of the program pattern.

FIG. 7B is a diagram showing an example of the screen generated by second screen component 322 and showing a list of section names corresponding to the section ID entered on the screen shown in FIG. 7A.

As described above, in the screen component calling process, the processes defined in the screen component are executed in predetermined order in accordance with the page transition signal. Consequently, the screen component calling process can be standardized and the program pattern can be efficiently generated.

As the processes defined in the screen component, the process of generating no first part or no second part in the SQL statement can be also defined and an error detecting process of detecting nothing can be also defined. By defining a dummy process as described above, four processes can be defined for each of all of screen components. As a result, the program pattern can call all of the processes defined in each screen component, so that the program pattern can be generated efficiently.

Although the process of executing the SQL statement (steps S23 and S29) is included in the screen component calling processes in the embodiment, the processes may be included in screen components 320 and 322, respectively. In this case, it is defined so that in the process of generating the second part in the command for accessing the database of the screen component, the second part is generated and, after that, a process of executing the SQL statement is performed. Similarly, although the processes for outputting a screen (steps S25 and S31) are included in the screen component calling process, the processes may be included in screen components 320 and 322. In this case, it is defined so that in the screen generating process of the screen component, a screen is generated and, after that, a process of outputting the generated screen is executed.

FIG. 8 is a diagram showing a concrete example of the portion of the program pattern, which defines three screen components used. Referring to FIG. 8, a screen component "PtnScrSearch" for displaying a search screen, a screen component "PtnScrList" for retrieving corresponding data on the basis of key data which is inputted on the search screen and displaying a list of the data, and a screen component "PtnScrDetail" for displaying detailed data of any of the data pieces displayed in the list are defined. The program pattern uses an object oriented language and includes not only the portion for defining the screen components used but also a portion of calling the four processes included in the screen component in predetermined order. The program pattern can share the part of calling four processes included in the screen component in predetermined order with other program patterns. Consequently, it is sufficient to define the screen component to be used in the generation of the program pattern.

FIGS. 9A to 9C are diagrams showing an example of screens displayed when the screen components are called. FIG. 9A is a diagram showing an example of the screen of the tenth page displayed when the screen component "PtnScrSearch" is called. The diagram shows the screen including a box in which a user ID is entered.

The screen component "PtnScrSearch" is called when a page transition signal of the tenth page is received, to execute the SQL statement and output the screen of the tenth page shown in FIG. 9A. When a page transition signal of the eleventh page is received, a process of checking an inputted user ID and a process for generating a "where" clause of the eleventh page are executed.

When the page transition signal of the eleventh page is received, the screen component "PtnScrList" executes the SQL statement and outputs the screen of the eleventh page shown in FIG. 9B. A case where "s*" is inputted on the screen shown in FIG. 9A is shown here as an example. Referring to FIG. 9B, a list of data of user IDs each having "s" as the first character is displayed. When a page transition signal of the twelfth page is received, a process of checking any of user IDs outputted on the eleventh page and a process for generating the "where" clause in the twelfth page are executed. As the process of checking the user ID, a process of performing nothing is set for the following reason. Since the user IDs displayed are retrieved from a database and displayed, it is unnecessary to check the user IDs.

When the transition signal of the twelfth page is received, the screen component "PtnScrDetail" executes the SQL statement and outputs the screen of the twelfth page shown in FIG. 9C. Referring to FIG. 9C, detailed data corresponding to the user ID "sumitomo1" in the data displayed in FIG. 9B is displayed.

As each of the checking process of the screen component "PtnScrDetail" and the process of generating the first part ("where" clause) in the SQL statement, a process of performing nothing is defined.

As described above, in the screen component calling process of the program pattern, a screen component to be called can be made vary according to a page transition signal, so that a screen component can be defined for each page transition signal.

Since a screen component is defined for each screen displayed, it is sufficient to call a screen component for each screen and the transition of screens can be easily achieved.

Further, a screen component is defined for each screen, two screens can be easily combined and it is unnecessary to newly generate a screen obtained by combining the two screens. For example, only by generating a screen component regarding a screen for displaying specific data and a screen component regarding a screen for displaying detailed data related to the specific data, the two screens can be combined by sequentially calling the two screen components.

Item objects for generating a screen when a program pattern is executed in server 10 in the embodiment will now be described. Japanese Patent Laying-Open No. 2001-325098 filed by the applicant of the present invention describes item objects in detail. The contents described in Japanese Patent Laying-Open No. 2001-325098 are incorporated by reference.

[Item Objects]

Figure 10:
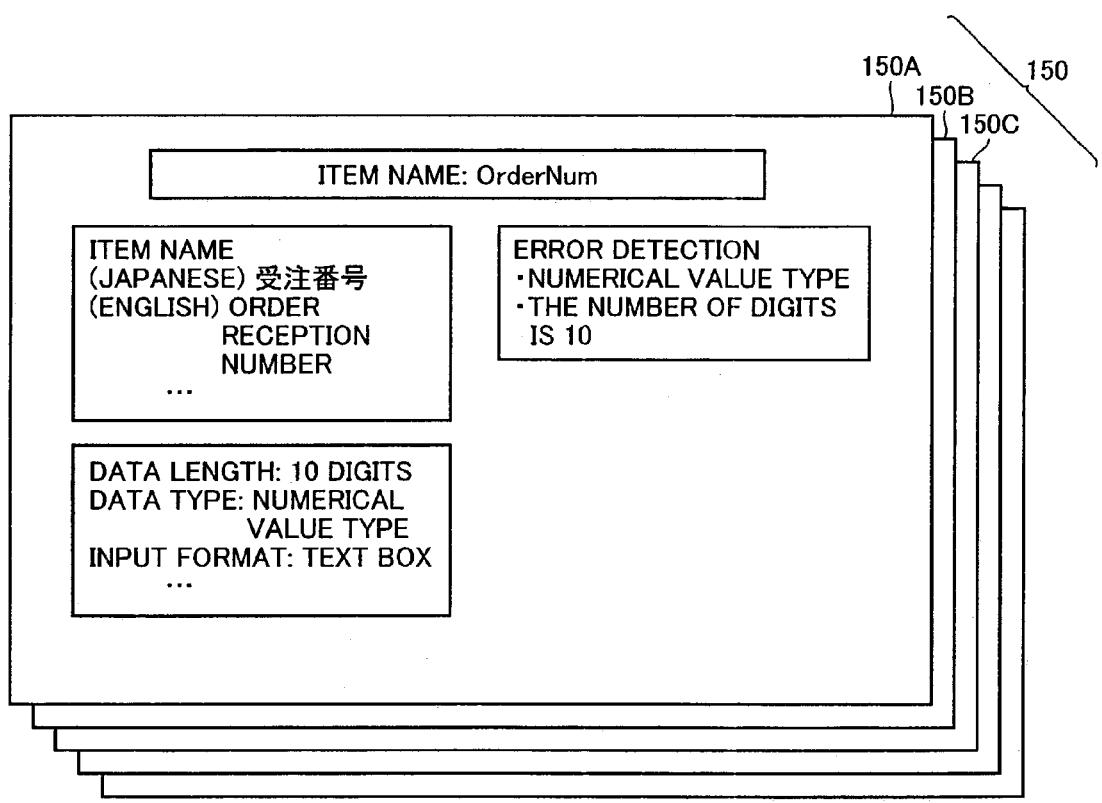
FIG. 10 is a schematic diagram for describing the concept of item objects.

Referring to FIG. 10, item objects 150 are objects which are set in correspondence with items of a database. An example of the item objects are item objects 150A corresponding to a data item of "order number" in an order receiving work. Item objects 150A are in an object class in a program development process. When a program is executed, an instance of item objects 150A are generated and used for execution of the program.

Since item objects 150 are in the object class, as shown in FIG. 10, in addition to the item name (for example, "Order-Num"), as properties, item names (name in Japanese, name in English, names in other languages, and the like), general attributes to be prepared when a data item is expressed as an abstract such as data length, data type (numerical value type, string type or the like), an input form (text box, radio button, check box, pull-down list, pull-down menu, combo box, slider or the like), the name of a corresponding DB column, and a program code in the form of a method, for checking whether inputted data is correct or not (for example, when the data type is a numerical value type, inputted data is a numerical value or not, the number of digits is within a data length or not, or the like) are provided.

Table 1 shows the attributes, method and the like of item objects.

TABLE 1

| | |
|---|---|
| Item name | Data name used for coding. Usually, column name of DB is used. |
| Item names | Japanese and English names of item. Used for screen display. |
| Name of corresponding DB column | Name of corresponding DB column |
| Data type | Character type, numerical value type, date type and so on |
| Input data length | Maximum length of data |
| Input form | Text box, selection box, radio button or the like |
| Values which can be inputted | A list of values displayed at the time of selective input |
| Help message | Description of item displayed at the time of input |
| Error detection | Implementation of logic of error detection |
| Essential item check | Check of whether input item is essential input or not |
| Others | Filter program for performing process peculiar to each item, and the like |

In Table 1, "item name" is a name used to refer to the data item during coding of a program. Usually, a column name corresponding to the item object in the DB is used and is constructed only by alphabets and a part of symbols.

Since the meaning of the other elements displayed in Table 1 may be obvious to the person skilled in the art, further description will not be given here.

[Extraction of Item Objects Definition from DB Definition]

In the program development system of the embodiment, item objects are prepared in the form of a source program of a class definition of the Java (R) language and in the text format. Since the item objects have deep relationship with a database, it is convenient to perform data definition of the item objects directly from database definition.

Figure 11:
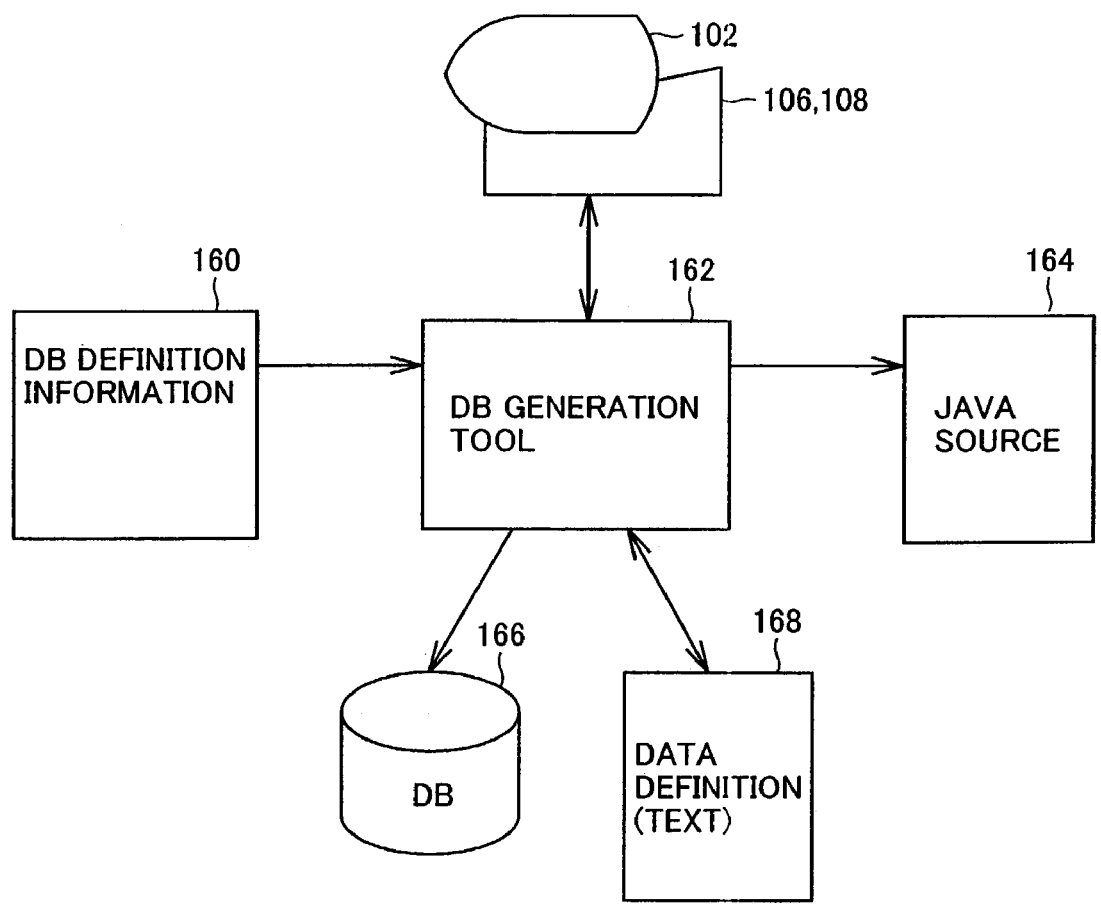
FIG. 11 is a block diagram of a tool for extracting item objects from DB definition information.

FIG. 11 is a schematic block diagram showing such a program development system. Obviously, the system can be realized by a general personal computer as shown in FIGS. 1 and 2 in practice.

Referring to FIG. 11, the system is constructed by a DB generation tool 162 for performing processes of: generating a database 166 from DB definition information 160 prepared in a text format; outputting data definition 168 as the prototype of definition of the item objects corresponding to each of items of database 166 from DB definition information 160 in a text format; modifying the contents of data definition 168 by an interactive process using display 102, keyboard 106 and mouse 108; and outputting a file of a Java (R) source 164 for defining the class of the item objects from modified data definition 168.

FIG. 12 shows an example of the contents of DB definition information 160. FIG. 13 shows an example of data definition 168. Data definition 168 shown in FIG. 13 is generated on the basis of information extracted from a line starting with "order reception number" immediately after the statement of "/Record" in DB definition information 160 in FIG. 12. Further, a necessary item is added to data definition 168 later by a programmer. Each line is constructed by a keyword indicative of an attribute (for example, "/LANG", "/INPUTTYPE" or the like) and the contents of the attribute corresponding to the keyword. A process of adding the prototype of program coding corresponding to a method of data check or the like to the contents of data definition 168 is also performed at this time.

By generating data definition 168 from DB definition information 160, the number of processes for generating item objects can be minimized.

Figure 14:
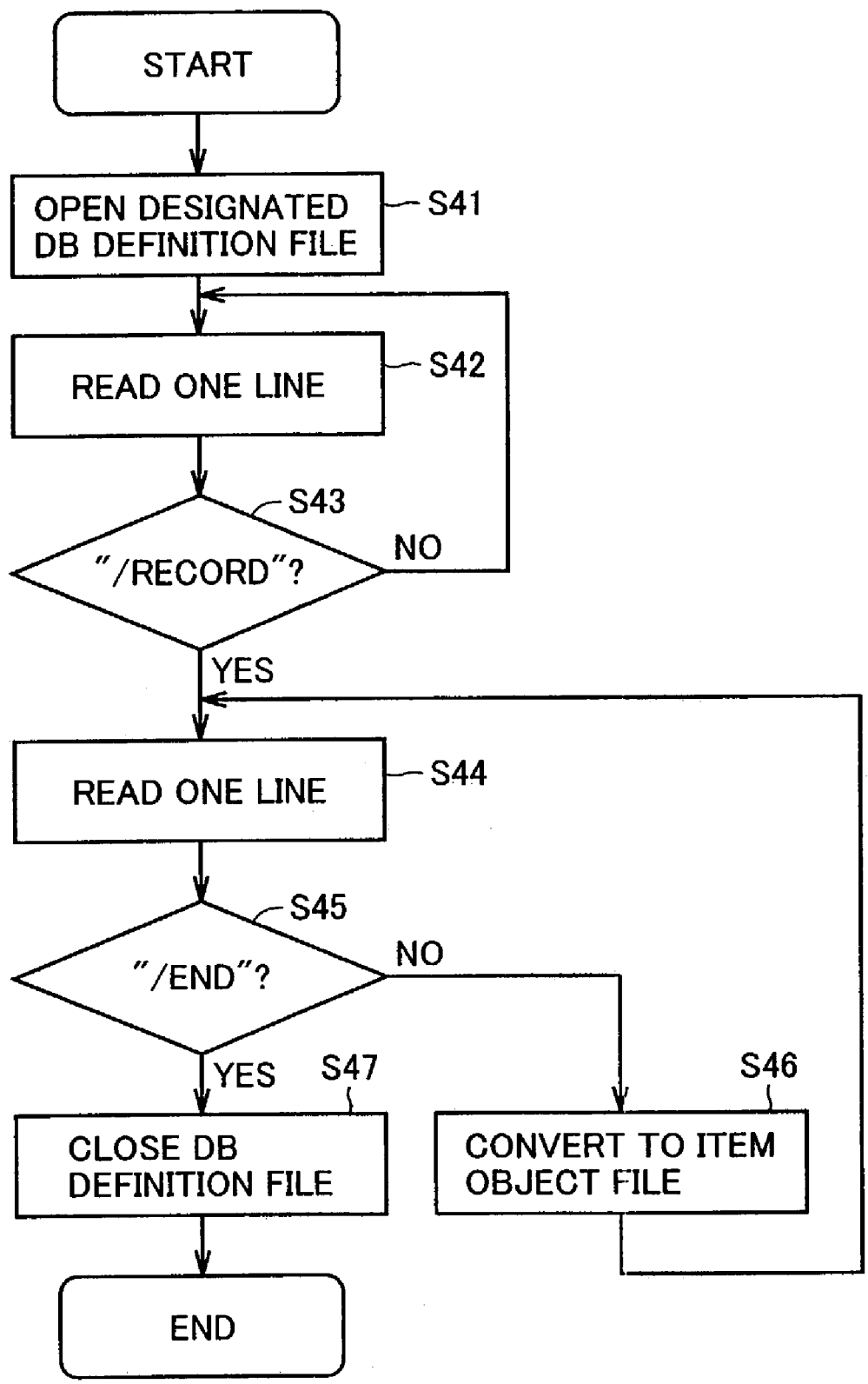
FIG. 14 is a flowchart of processes for generating a data definition file of item objects from the DB definition file.

FIG. 14 is a flowchart schematically showing a program of generating data definition 168 from DB definition information 160. Referring to FIG. 14, first, a DB definition file designated by the programmer is opened (step S41). After that, the first line of the file is read (step S42). Whether the data of the line is "/RECORD" or not is determined (step S43). The processes of steps S42 and S43 are repeated until the contents of a read line are read as "/RECORD".

After reading one line of "/RECORD", a process of generating and outputting data definition 168 every line of DB definition is repeated. Concretely, first, the next line of DB definition information 160 is read (step S44) and whether the data of the line is "/END" or not is determined (step S45). If it is not "/END", data definition 168 is generated from the data of the read line and outputted as an item object file (step S46), and a process of reading the next line is performed (step S44). If the data of the read line is "/END", it means that all of DB items in DB definition information 160 have been processed, so that the DB definition file is closed (step S47) and the process is finished.

The process in step S46 is determined on the basis of the corresponding relation between the format of DB definition and the format of data definition 168. Since the process depends on a system and is obvious to a person skilled in the art, the details will not be described here.

[Screen Output Using Item Objects]

Figure 15:
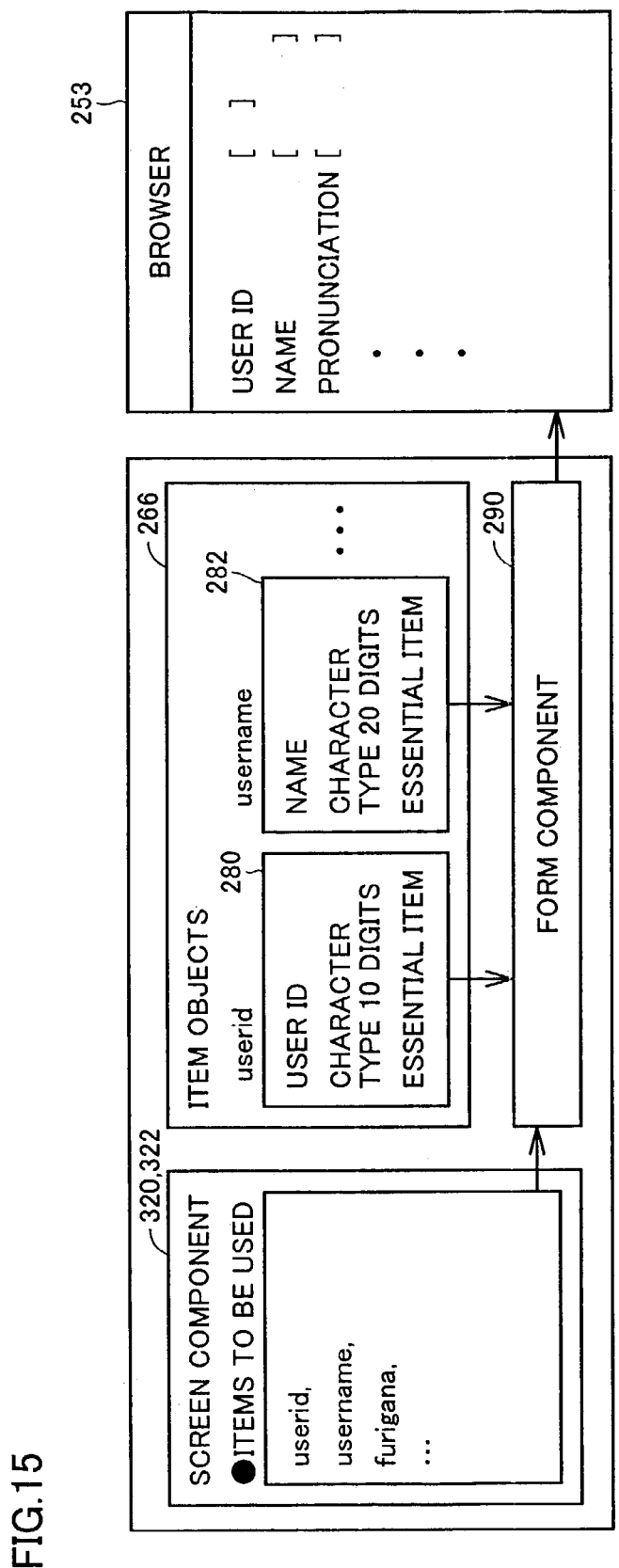
FIG. 15 is a diagram showing the relation between item objects and a screen component when a screen component using item objects operates according to an embodiment of the present invention.

FIG. 15 schematically shows a mechanism of outputting a screen (HTML source output) by using item objects stored in a memory space 266 in RAM 120 or the like. Referring to FIG. 15, screen components 320 and 322 provide information for specifying items used in a screen to a form component 290. Form component 290 finds item objects corresponding to the items given from screen components 320 and 322 in memory space 266. Since all of information such as data name and data length to be displayed on the screen is included in an item objects, by obtaining the information from the item objects, form component 290 can generate an HTML source to be given to browser 253 or the like. By transmitting the generated HTML source to browser 253 or the like, for example, the screen shown in FIGS. 7A and 7B is displayed by the browser operating on the client PC.

Figure 16:
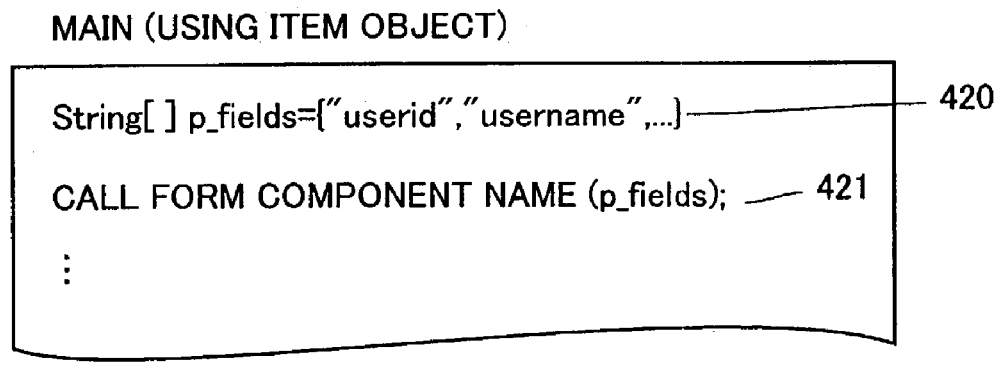
FIG. 16 is a diagram showing a part of an example of coding a main program.

Since the information such as the name of the item to be displayed, data length, and data format is obtained from the item objects, the information is not coded in components 320 and 322. FIG. 16 shows an example of a part of screen components 320 and 322. Referring to FIG. 16, in the program of screen components 320 and 322, a constant "p_fields" as a list of item object names to be used in the process is defined in a parameter definition line 420, and the constant is given as a parameter to the form component by a call command 421 of calling the form component in a following logic. That is, designation of the item objects directly connected to business operation is seen only in parameter definition line 420. Designation of the item objects is defined in program definition file 312. In the case where screen components 320 and 322 are executed, the designation of the item objects defined in program definition file 312 is referred to. Consequently, designation of the item objects directly connected to the business operation is seen only in program definition file 312.

In this case, when parameters given from screen components 320 and 322 to form component 290 are set as {userid, username, pronunciation, . . . } as shown in FIG. 16, only by changing the parameters to a list of names of the other item objects in program definition file 312, display of a quite another screen can be realized by using the same logic of screen components 320 and 322 and the same form component 290.

Figure 17:
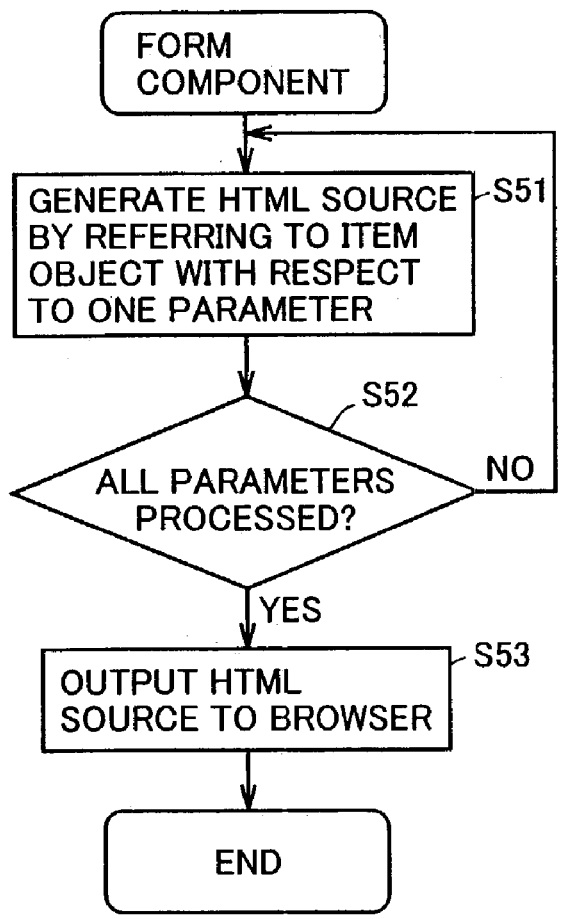
FIG. 17 is a flowchart of processes for realizing a form component.
Figure 18:
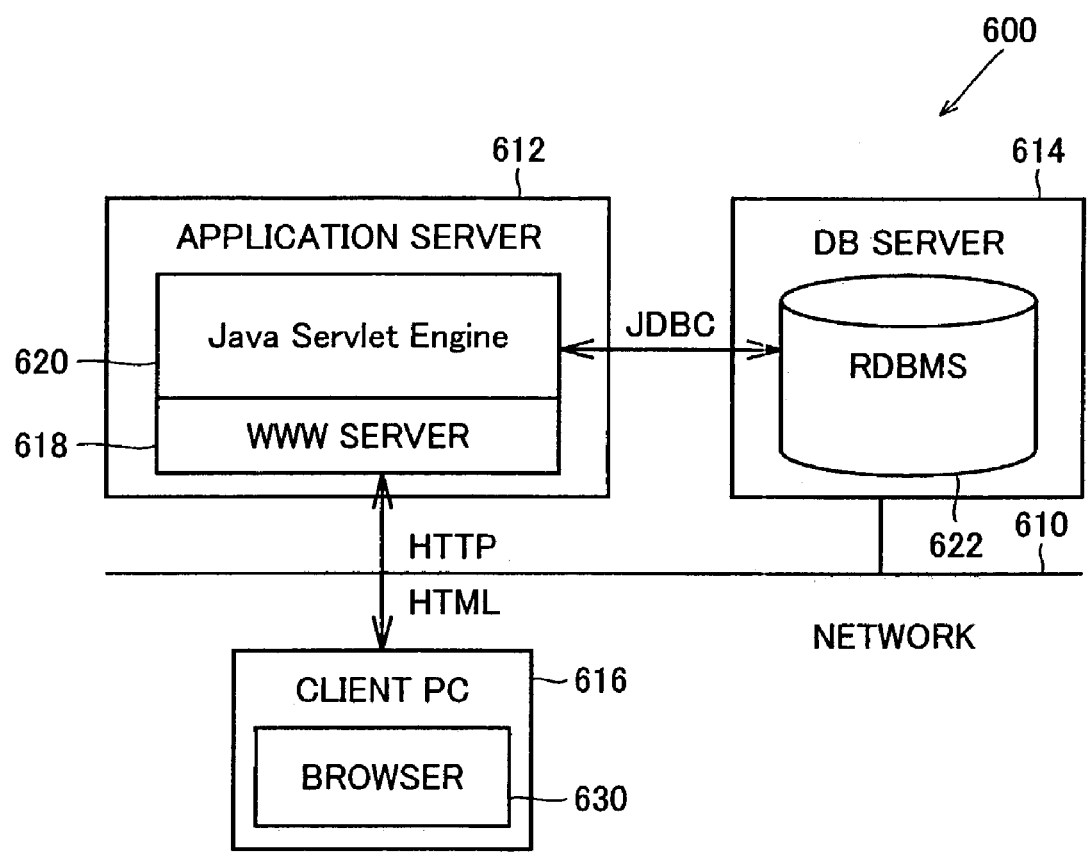
FIG. 18 is a block diagram showing an example of the configuration of a system built by a conventional intranetwork.

FIG. 17 is a flowchart showing the logic of a program for generating the form component. The following process is performed on each of the given parameters from the beginning in order. With respect to each parameter, an item object designated by the parameter is referred to, and an HTML source corresponding to a form component for inputting the item is generated from information such as the item name and data length (step S51).

Subsequently, whether all of parameters are processed or not is determined (step S52). Until all of the parameters are processed, the processes of steps S51 and S52 are repeated.

When it is determined that all of parameters are processed, an HTML source formed by the processes is outputted to browser 253 or the like (step S53) and the process is finished.

As described above, information peculiar to any item objects is not coded in the logic of the screen component. As a result, the screen component can be commonly reused in various processes. Since form component 290 itself is separated from the information peculiar to any item objects, form component 290 can be also commonly reused in various processes.

According to the present invention, by using item objects, an user interface is successfully separated from a program and used as a component. Further, by implementing the logic for error detection of the item and for DB updating as a method in an item object, a program part directly connected to a business operation can be used as a component.

Although the example of using item objects for generating a screen when a program pattern is executed has been described in the embodiment, formation of a screen is not limited thereto.

For example, in a screen component, all of data necessary for generating a screen may be defined. Even in this case, since a check process and a process of generating a first part ("where" clause) in a command which have to be modified when a screen is modified are included in the same screen component, the technique can easily deal with such a change.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer program product including a computer readable medium storing a computer program that accesses a database by causing a computer to execute a plurality of screen components, each of said plurality of screen components defining a set of common processes in a predetermined order, said common processes being structured to access said database whether each of said set of common processes is used or not being defined in a definition provided independently of each screen component, said computer program causing the computer to perform the steps of:

receiving predetermined order of said plurality of screen components to be executed by the computer; and executing each of said plurality of screen components defining the set of common processes, in accordance with said order, wherein the execution of each of said plurality of screen components includes the steps of:

generating a second part except for a first part to specify data to be processed in a command to access said database in accordance with said definition for each screen component when it is defined that the step of generating the second part is to be executed in said definition;

generating a screen to input and/or output data based on the result of the execution of the step of generating the second part in accordance with said definition; and generating the first part to specify data to be processed in the command to access said database in accordance with said definition for each screen component when it is defined that the step of generating the first part is to be executed in said definition.

2. The computer program product according to claim 1, wherein said screen generating step generates a screen in accordance with an item in said database for each screen component.

3. The computer program product according to claim 1, further comprising a step of:

designating an order to execute said steps included in each of said plurality of screen components so as to be executed in the same order in all of said plurality of screen components.

4. The computer program product according to claim 1, wherein the execution of each of said plurality of screen components further includes a step of checking obtained data in accordance with items of said database for each screen component.

5. The computer program product according to claim 1, wherein in said step of generating said first part, said first part in a command to be executed when the next screen component is implemented by said computer is generated.

6. The computer program product according to claim 4, wherein in said step of generating said first part, said first part in the command is generated on the basis of data checked in said check step.

7. The computer program product according to claim 1, wherein said step of generating said second part includes a process which does not generate said second part.

8. The computer program product according to claim 4, wherein said check step includes a process of checking nothing.

9. The computer program product according to claim 1, wherein said step of generating said first part includes a process which does not generate said first part.

10. The computer program product according to claim 1, wherein the execution of said screen component further includes a step of outputting the generated screen after said screen generating step.

11. The computer program product according to claim 1, wherein the execution of each one of said screen components further includes a step of executing a command determined by most recently generated one of said first parts and said second part after said step of generating said second part.

12. The computer program product according to claim 11, further comprising a step of:
    generating an HTML source after said step of executing the command determined by said first and second parts.

13. The computer program product according to claim 1, wherein
    said first and second parts are stored in a common area in a memory.

14. The computer program product according to claim 1, wherein
    the definition is described in an XML or CSV.

15. The computer program product according to claim 1, wherein
    said step of designating order includes the steps of:
    receiving a page transition signal; and
    executing said screen component in accordance with said received page transition signal.

16. The computer program product according to claim 1, wherein
    said step of generating said first part includes a step of generating a part except for a "where" clause in an SQL sentence, and
    said step of generating said second part includes a step of generating the "where" clause in the SQL sentence.

17. The computer program product according to claim 1, wherein
    said step of generating said screen includes the steps of:
    preparing, for each of items of said database, a form component item necessary to input or output the item with reference to an item object corresponding to the item; and
    generating a source file according to a predetermined format to realize a form component in which said form component items are arranged.

18. The computer program product according to claim 17, wherein
    said form component item preparing step includes a step of finding an item object corresponding to an item in said database given from the outside for each of said screen components.

19. A computer-readable recording medium in which a program of accessing a database by causing a computer to execute a plurality of screen components is recorded, each of said plurality of screen components defining a set of common processes in a predetermined order, said common processes being structured to access said database whether each of said set of common processes is used or not being defined in a definition provided independently of each screen component, the program causing the computer to perform the steps of:
    receiving predetermined order of said plurality of screen components to be executed by the computer; and
    executing each of said plurality of screen components defining the set of common processes, in accordance with said order, wherein
    the execution of each of said plurality of screen components includes the steps of:
    generating a second part except for a first part to specify data to be processed in a command to access said database in accordance with said definition for each screen component when it is defined in the step of generating the second part is to be executed in said definition;
    generating a screen to input and/or output data based on the result of the execution of the step of generating the second part in accordance with said definition; and
    generating the first part to specify data to be processed in the command to access said database in accordance with said definition outside for each screen component when it is defined that the step of generating the first part is to be executed in said definition.

20. A method of operating a database by causing a computer to execute a plurality of screen components, each of said plurality of screen components defining a set of common processes in a predetermined order, said common processes being structured to access said database whether each of said set of common processes is used or not being defined in a definition provided independently of each screen component, comprising the steps of:
    receiving predetermined order of said plurality of screen components to be executed by the computer; and
    executing each of said plurality of screen components defining the set of common processes, in accordance with said order, wherein
    the execution of each of said plurality of screen components includes the steps of:
    generating a second part except for a first part to specify data to be processed in a command to access said database in accordance with said definition for each screen component when it is defined that the step of generating the second part is to be executed in said definition;
    generating a screen to input and/or output data based on the result of the execution of the step of generating the second part in accordance with said definition; and
    generating the first part to specify data to be processed in the command to access said database in accordance with definition outside for each screen component when it is defined that the step of generating the first part is to be executed in said definition.

21. A database server comprising: a memory unit storing a plurality of screen components, each of said plurality of screen components defining a set of common processes in a predetermined order, said common processes being accessing structured to access said database whether each of said set of common processes is used or not being defined in a definition provided independently of each screen component; and
    a processor executing said screen components; wherein said processor
    receives predetermined order of said plurality of screen components to be executed by said database server;
    executes each of said plurality of screen components in accordance with said order;
    generates a second part except for a first part to specify data to be processed in a command to access said database in accordance with said definition for each screen component when it is defined that the step of generating the second part is to be executed in said definition;
    generates a screen to input and/or output data based on the result of the execution of the step of generating the second part in accordance with said definition; and
    generates the first part to specify data to be processed in the command to access said database in accordance with said definition for each screen component when it is defined that the step of generating the first part is to be executed in said definition.

* * * * *